United States Patent
Kondo et al.

(10) Patent No.: US 9,597,773 B2
(45) Date of Patent: Mar. 21, 2017

(54) BLAST TREATMENT DEVICE AND BLAST TREATMENT METHOD

(71) Applicant: FUJI JUKOGYO KABUSHIKI KAISHA, Tokyo (JP)

(72) Inventors: Yoshihiko Kondo, Tochigi (JP); Hirotsugu Takazawa, Tochigi (JP); Hisayuki Oode, Tokyo (JP); Tatsuo Nakahata, Tokyo (JP); Shinya Matsuo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/813,609

(22) Filed: Jul. 30, 2015

(65) Prior Publication Data
US 2016/0039070 A1 Feb. 11, 2016

(30) Foreign Application Priority Data
Aug. 6, 2014 (JP) .................. 2014-160720

(51) Int. Cl.
*B24C 3/00* (2006.01)
*B24C 3/02* (2006.01)
*B24C 9/00* (2006.01)

(52) U.S. Cl.
CPC . *B24C 3/02* (2013.01); *B24C 9/00* (2013.01)

(58) Field of Classification Search
CPC .................................. B24C 3/02; B24C 9/00
USPC ............................................................ 451/38
See application file for complete search history.

(56) References Cited

U.S. PATENT DOCUMENTS

| | | | | |
|---|---|---|---|---|
| 5,325,637 A | * | 7/1994 | Yasuda | ..................... B24C 1/06 451/38 |
| 5,947,796 A | * | 9/1999 | Imayama | .................. B08B 5/02 451/2 |
| 6,524,172 B1 | * | 2/2003 | Rivir | ........................ B24C 9/00 451/75 |

(Continued)

FOREIGN PATENT DOCUMENTS

| | | |
|---|---|---|
| DE | 1213594 | 3/1966 |
| EP | 1724054 | 11/2006 |

(Continued)

OTHER PUBLICATIONS

Extended European search report issued Jan. 8, 2016, in patent Application No. 15 178 881.7. (5 pages).

(Continued)

*Primary Examiner* — George Nguyen
(74) *Attorney, Agent, or Firm* — Smith, Gambrell & Russell, LLP (57) ABSTRACT

According to one implementation, a blast treatment device includes at least one nozzle, a movement structure and at least one weight member. The at least one nozzle injects blast media. The movement structure reciprocates the at least one nozzle along a track. The at least one weight member cancels a vibration caused by reciprocating the at least one nozzle. Further, according to one implementation, a blast treatment method includes injecting blast media from at least one nozzle; manufacturing a blast treated product by reciprocating the at least one nozzle along a track; and canceling a vibration, caused by reciprocating the at least one nozzle, by at least one weight member.

13 Claims, 4 Drawing Sheets

(56) References Cited

U.S. PATENT DOCUMENTS

| | | | |
|---|---|---|---|
| 7,556,554 B2 | 7/2009 | Brug et al. | |
| 2004/0074632 A1* | 4/2004 | Shiraishi | B08B 9/057 165/76 |
| 2005/0023374 A1* | 2/2005 | Knobbe | B05B 1/04 239/280 |
| 2006/0079157 A1* | 4/2006 | Van Brug | B24B 13/005 451/42 |
| 2008/0268757 A1* | 10/2008 | Mase | B24C 9/00 451/340 |
| 2016/0039070 A1* | 2/2016 | Kondo | B24C 3/02 451/38 |

FOREIGN PATENT DOCUMENTS

| | | |
|---|---|---|
| JP | 58-017957 U | 2/1983 |
| JP | 59014596 | 1/1984 |
| JP | 05-256047 A | 10/1993 |
| JP | 08252769 | 10/1996 |
| JP | 2000190226 | 7/2000 |
| JP | 2003-205465 A | 7/2003 |
| JP | 2003-291067 A | 10/2003 |
| JP | 2004025351 | 1/2004 |
| JP | 2006-512215 A | 4/2006 |
| JP | 2010-174550 A | 8/2010 |
| JP | 2013-215826 | 10/2013 |
| JP | 2014-155977 | 8/2014 |
| WO | 2004/058452 A2 | 7/2004 |

OTHER PUBLICATIONS

First Japanese Office Action issued Oct. 4, 2016, in Japanese Patent Application No. 2014-160720. (Japanese with English Translation—8 pages).

First Japanese Office Action issued Oct. 4, 2016, in Japanese Patent Application No. 2013-027739. (Japanese with English Translation—8 pages).

* cited by examiner

BLAST TREATMENT DEVICE AND BLAST TREATMENT METHOD

CROSS REFERENCES TO RELATED APPLICATIONS

This application is based upon and claims the benefit of priority from Japanese Patent Application No. 2014-160720, filed on Aug. 6, 2014; the entire contents of which are incorporated herein by reference.

FIELD

Implementations described herein relate generally to a blast treatment device and a blast treatment method.

BACKGROUND

Conventionally, blast treatment is known as a surface treating technique in which hard particles injected by compressed air are hit on a surface of a workpiece, such as a machined part or a painted part. According to the blast treatment, rust or dirt on a surface of a workpiece can be removed. Therefore, the blast treatment is used mainly for a surface treatment, such as paint peeling or shot peening, besides a substrate treatment before a paint or the like.

The blast treatment is performed by injecting blast media with compressed air from a nozzle for blast treatment toward a workpiece. Therefore, to prevent scattering of injected blast media is a problem in the blast treatment. Thus, a blast treatment device having a duct line for recovering blast media near a nozzle for injecting the blast media and having a structure in which the nozzle and the duct line for recovering the blast media are covered by a casing has been proposed so as to prevent scattering of the blast media (for example, refer to Japanese Patent Application Publication No. H08-252769, Japanese Patent Application Publication No, 2000-190226 and Japanese Patent Application Publication No, 2004-25351).

Furthermore, a technique to move a nozzle by a multijoint manipulator has been devised to clean a large workpiece, such as a panel for ship, by a sandblasting method (for example, refer to Japanese Patent Application Publication No. S59-14596). In this technique, a nozzle and a casing which covers the nozzle are configured to be self-propelled with wheels. Furthermore, a counter weight for balancing an actuator is used together as a driving source for raising the nozzle in the vertical direction.

However, the conventional blast treatment device has a problem that it is difficult to perform blast treatment of a workpiece having an irregular surface or a large area. For example, in case of a workpiece having an irregular surface, to place a casing for preventing scattering of blast media causes interference with the workpiece. Meanwhile, when a casing for preventing scattering is distanced from a workpiece or removed, scattering of blast media cannot be prevented.

Furthermore, scattering of blast media causes a problem that dust of the blast media mixes in a driving part, such as a linkage. Therefore, in case of performing blast treatment of a large workpiece which requires to move a nozzle for injecting blast media, a countermeasure has been taken so as to move the nozzle by a multijoint manipulator whose joint portions have been covered with a dust-proof cover.

However, when a multijoint manipulator is used, a moving range of a nozzle is limited depending on lengths of links of the manipulator. Therefore, when a size of a workpiece is extremely large, it is necessary to prepare a manipulator having very long links according to the size of the workpiece.

In particular, a length of a panel which is one of aircraft part is a meter order, and many panels have fixed protruding objects, such as stringers. Therefore, it is difficult to use the conventional blast treatment device for a panel of an aircraft. As a result, manual work such that a worker polishes a workpiece with a sandpaper as a substrate treatment before painting a panel for an aircraft is currently performed.

Thus, an object of the present invention is to provide a blast treatment device and a blast treatment method which can flexibly adapt to a size or a form of a workpiece and stably perform blast treatment.

SUMMARY OF THE INVENTION

In general, according to one implementation, a blast treatment device includes at least one nozzle, a movement structure and at least one weight member. The at least one nozzle injects blast media. The movement structure reciprocates the at least one nozzle along a track. The at least one weight member cancels a vibration caused by reciprocating the at least one nozzle.

Further, according to one implementation, a blast treatment method includes injecting blast media from at least one nozzle; manufacturing a blast treated product by reciprocating the at least one nozzle along a track; and canceling a vibration, caused by reciprocating the at least one nozzle, by at least one weight member.

DETAILED DESCRIPTION

A blast treatment device and a blast treatment method according to implementations of the present invention will be described with reference to the accompanying drawings.
(First Implementation)
(Structure and Function)

Figure 1:
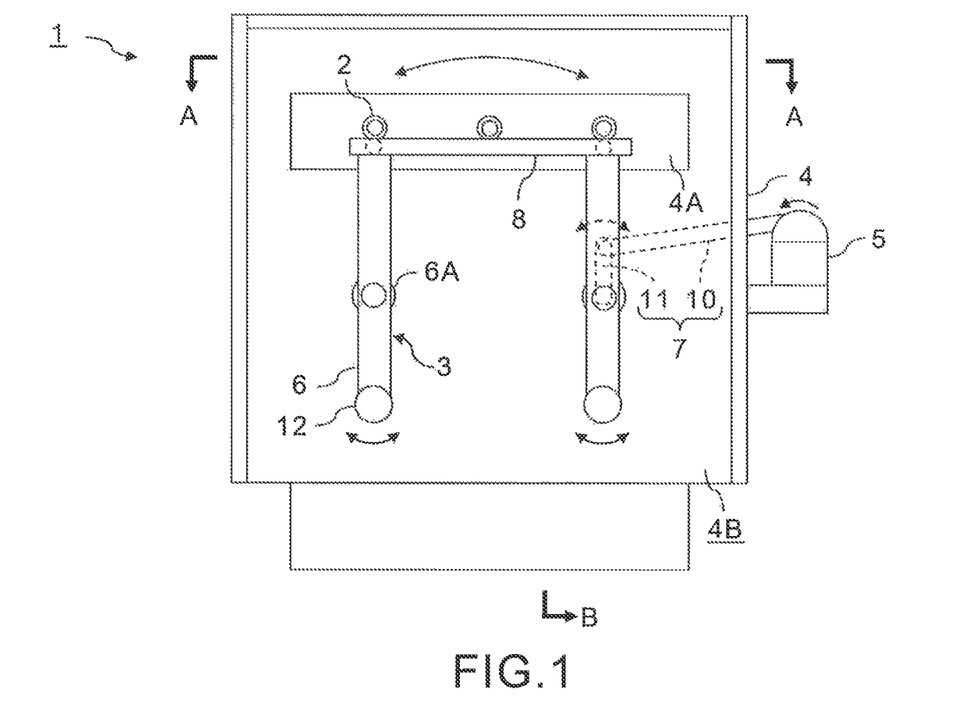
FIG. 1 is a front view of a blast treatment device according to the first implementation of the present invention.
Figure 2:
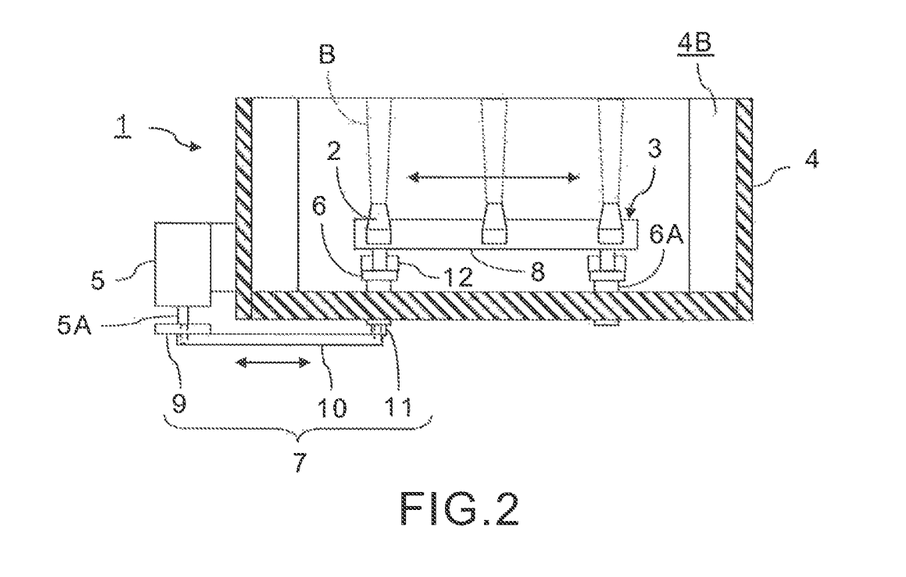
FIG. 2 is a sectional view, as viewed from the position AA, of the blast treatment device shown in FIG. 1.
Figure 3:
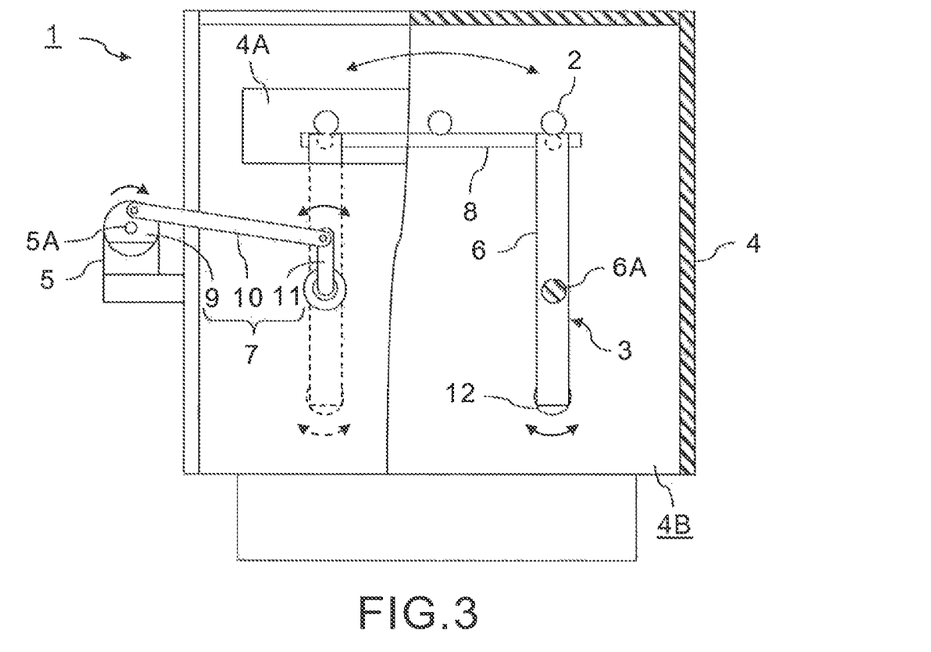
FIG. 3 is a back view of the blast treatment device shown in FIG. 1.
Figure 4:
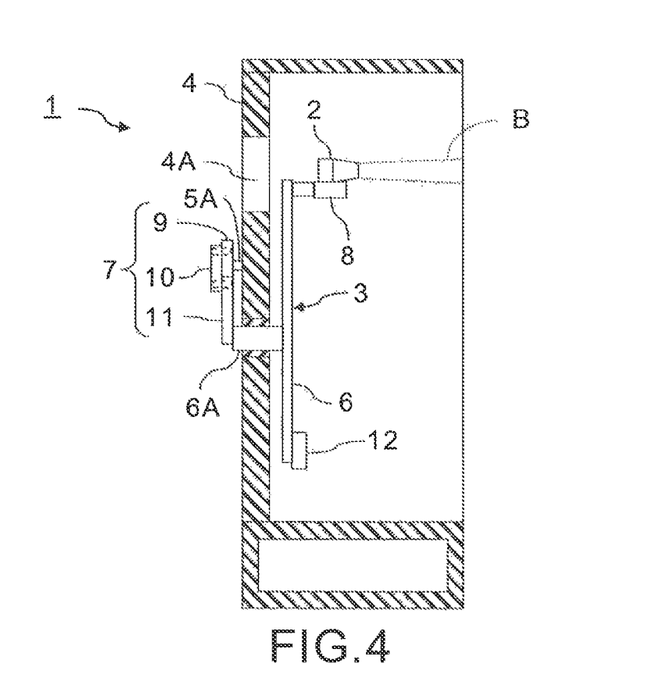
FIG. 4 is a sectional view, as viewed from the position B-B, of the blast treatment device shown in FIG. 1.

FIG. 1 is a front view of a blast treatment device according to the first implementation of the present invention, FIG. 2 is a sectional view; as viewed from the position A-A, of the blast treatment device shown in FIG. 1, FIG. 3 is a back view of the blast treatment device shown in FIG. 1, and FIG. 4 is a sectional view, as viewed from the position B-B, of the blast treatment device shown in FIG. 1.

A blast treatment device 1 can be composed using at least one nozzle 2, which injects blast media B, and a movement structure 3, which reciprocates the nozzle 2 along a track. In the example shown in the figures, the blast treatment device 1 has a plurality of nozzles 2 in order to improve an efficiency of blast treatment. Each of the nozzles 2 is attached to one end of a supply hose of the blast media B. Meanwhile, the other end of the supply hose of the blast media B is connected with a supply system of the blast media B. Note that, the supply system and the supply hoses of the blast media B are omitted to be shown in the figures.

Preferably, the blast treatment device 1 has a dust-proof body 4 which covers at least the nozzles 2 in order to prevent scattering of the blast media B. The dust-proof body 4 may be a flexible dust-proof cover as well as a rigid dust-proof case which also serves as a chassis as shown in the figures.

In the example shown in the figures, one side of the dust-proof body 4 serving as a dust-proof case has been opened. Then, the blast media B can be injected toward a workpiece from the opened side of the dust-proof body 4. As a matter of course, a workpiece may be placed inside the dust-proof body 4 serving as a chassis. When a workpiece is always placed inside the dust-proof body 4, all the four sides of the dust-proof body 4 may be closed so as to obtain a dust-proof effect, and an opening and closing door for taking the workpiece in and out may be provided.

On the other hand, the dust-proof body 4 has a transparent observation window 4A for observing blast treatment, in the side opposite to a workpiece. Furthermore, the dust-proof body 4 has spaces 4B near the bottom so that the supply hoses of the blast media B can pass though.

The movement structure 3 can be composed of a motor 5, rotating members 6, a power transmission structure 7 and a bar-shaped member 8. The motor 5 is a power source of the movement structure 3. An output shaft 5A of the motor 5 is connected with a rotating shaft 6A of one rotating member 6 with the power transmission structure 7. Thus, each rotating member 6 is configured to repeat normal rotation and reverse rotation around the rotating shaft 6A as a fulcrum, using the output of the motor 5 as a power source. Therefore, the motor 5 has the output shaft 5A at a position where the output shaft 5A is not on a same straight line as the rotating shaft 6A of each rotating member 6.

The bar-shaped member 8 is for fixing the single nozzle 2 or the plural nozzles 2. When the plural nozzles 2 are disposed in the horizontal direction as shown in the figures, the bar-shaped member 8 is disposed so that its longitudinal direction becomes the horizontal direction. Then, the bar-shaped member 8 is linked with the rotating members 6. Thereby, one end side of each of the rotating members 6 is connected with the nozzles 2 through the bar-shaped member 8.

The bar-shaped member 8 can be connected with each rotating member 6 by a shaft, a bearing or the like so that the bar-shaped member 8 can rotate relative to each rotating member 6. When the bar-shaped member 8 is rotatably connected with the rotating members 6, a linkage mechanism is formed. Therefore, the respective nozzles 2 can be reciprocated with the bar-shaped member 8 like a wiper by reciprocating the rotating members 6. Note that, when a single rotating member 6 is provided, the bar-shaped member 8 may be fixed to the rotating member 6 so as to improve stability.

Meanwhile, the bar-shaped rotating members 6 can be rotatably connected with the common bar-shaped member 8 as shown in the figures. Specifically, one end sides of the rotating members 6 which repeat normal rotation and reverse rotation around the corresponding rotating shafts 6A as fulcrums respectively can be connected with the bar-shaped member 8. In this case, a linkage mechanism is formed by the rotating members 6 and the bar-shaped member 8. Therefore, rigidity of the movement structure 3 can be improved. Furthermore, the bar-shaped member 8 can be reciprocated with pointing the bar-shaped member 8 in the horizontal direction constantly.

Note that, the nozzles 2 may be fixed to the rotating members 6 directly. In that case, the bar-shaped member 8 may also be omitted. Even when the nozzles 2 are directly fixed to the rotating members 6, rigidity of the movement structure 3 can be also improved by connecting the rotating members 6 with each other using the bar-shaped member 8.

When the movement structure 3 is composed using a plurality of the rotating members 6 as shown in the figures, at least one of the rotating members 6 has only to be connected with the motor 5 by the power transmission structure 7. The power transmission structure 7 is configured to transmit one directional rotative power, from the output shaft 5A of the motor 5, to the rotating shaft 6A as power for repeating normal rotation and reverse rotation of the rotating members 6. Therefore, the movement structure 3 with elements including the motor 5 forms a crank mechanism.

The movement structure 3 can also be composed by disposing the motor 5 so that the output shaft 5A of the motor 5 is on the same straight line as the rotating shaft 6A of the rotating member 6. However, it becomes necessary to invert the rotational direction of the output shaft 5A of the motor 5 intermittently in order to reciprocate the rotating members 6. That is, it becomes necessary to dispose the motor 5, whose output shaft 5A repeats normal rotation and reverse rotation, on the rotating shaft 6A of the rotating member 6. However, changing the rotational direction of the motor 5 leads to consumption of the motor 5. Accordingly, the consumption of the motor 5 can be suppressed by adopting a structure in which the output shaft 5A of the motor 5 has been shifted from the rotating shaft 6A of the rotating member 6 and connected with the rotating shaft 6A by the power transmission structure 7.

The power transmission structure 7 can be composed of a rotating plate 9 and a connecting bar 10. The rotating plate 9 is fixed to the output shaft 5A of the motor 5. The connecting bar 10 is rotatably linked to each of a portion, which is not on the rotating shaft 6A, of the rotating member 6 and a portion, other than the rotation center, of the rotating plate 9. The connecting bar 10 may also be directly connected to the rotating member 6.

Alternatively, one end of a bar-shaped lever 11 may be fixed to the rotating shaft 6A of the rotating member 6 so that the lever 11 are away from the rotating member 6 at a predetermined interval while the other end of the lever 11 may be rotatably connected to the connecting bar 10, as shown in the figures. In this case, at least the motor 5 and the power transmission structure 7 can be disposed outside the dust-proof body 4. Namely, a driving portion of the link mechanism can be disposed outside the dust-proof body 4. Therefore, the power transmission structure 7 and the motor 5 can be prevented from clogging due to scattering of the blast media B.

It is desirable to adjust a weight of the rotating plate 9, in the side opposite to the connection position of the connecting bar 10 with respect to the rotation center, to be a weight by which a vibration caused by rotation of the rotating plate 9 can be suppressed. Specifically, it is preferable to adjust the weight of the rotating plate 9 so that the rotational moment of the rotating plate 9 by gravity around the rotation center with considering the weight of the connecting bar 10 becomes zero, from a viewpoint of suppressing the vibration of the rotating plate 9.

As a specific example, through holes in the thickness direction can be formed on the rotating plate 9 so as to reduce the weight and the torque necessary for rotation of the rotating plate 9, in the side in which the connecting bar 10 is connected with the rotating plate 9. Meanwhile, the thickness of the rotating plate 9 in the side in which the connecting bar 10 is not connected with the rotating plate 9 can be relatively thickened. Thereby, the rotational moment of the gravity can be balanced. Consequently, a vibration of the rotating plate 9 can be suppressed and uneven wear of a bearing which is used for connecting the connecting bar 10 can also be avoided.

Furthermore, the blast treatment device 1 has at least one weight member 12 which cancels a vibration caused by a reciprocation of the nozzle 2 or the nozzles 2. The weight member 12 is disposed on the other end side of the rotating member 6 with respect to the fulcrum. Therefore, when the plural rotating members 6 are provided, the weight members 12 are attached to the other end sides of the rotating members 6 with respect to the respective fulcrums, as shown in the figures.

The weights and positions of the weight members 12 are determined so that the rotational moment of the rotating members 6 by the gravity in the nozzles 2 side around the fulcrums becomes not more than the rotational moment by the gravity in the weight members 12 side around the fulcrums. Therefore, the longer distances between the fulcrums and the weight members 12 by lengthening the lengths of the rotating members 6, the lighter the weight members 12 can be.

In principle, it is optimal to determine weights and positions of the weight members 12 so that the rotational moments of the rotating members 6 by the gravity around the fulcrums becomes zero respectively. When it is difficult to balance the rotational moment in order to prevent mechanical interference, to make the lower rotational moment larger than the upper rotational moment leads to improving the stability by lowering the center of gravity.

In the example shown in the figures, the respective end portions in the upper side of the bar-shaped rotating members 6 have been connected with the nozzles 2. Therefore, the disk-shaped weight member 12 has been fixed to the end portion in the lower side of each bar-shaped rotating member 6. As a matter of course, the weight members 12 may be attached to the upper side of the rotating members 6 while the nozzles 2 may be connected to the lower side of the rotating members 6. Furthermore, the bar-shaped member 8 and the rotating members 6 may be disposed so that the nozzles 2 reciprocate in the vertical direction or a desired direction while the weight members 12 may be attached to the end sides, opposite to the nozzles 2, of the rotating members 6.

As other features of the movement structure 3, it is preferable to configure the movement structure 3 so that the height of the bar-shaped member 8 for fixing the nozzles 2 becomes maximum when the heights of the weight members 12 become minimum. In this case, when the longitudinal direction of each rotating member 6 becomes the vertical direction and the weight members 12 reach the lowest points, the angle between the longitudinal direction of each rotating member 6 and the longitudinal direction of the bar-shaped member 8 becomes the right angle. Therefore, when the nozzles 2 have been swung, the left movement and the right movement become symmetric. Thereby, the left and right movement distances become equal. As a result, degradation in life of bearings, used for connecting the rotating members 6 with the bar-shaped member 8, due to local wears, can be reduced.

(Operation and Action)

Next, an operation and action of the blast treatment device 1 will be described.

When blast treatment is performed using the blast treatment device the blast treatment device 1 itself can be placed on a conveying device, such as a gondola, according to a size and a form of a workpiece to be a target of the blast treatment. Therefore, the blast treatment device 1 can easily perform blast treatment even of a large-sized workpiece having concavity and convexity, such as a panel of an aircraft to which stringers have been attached. As a matter of course, when a workpiece is small, the blast treatment device 1 may be placed without using a conveying device. Further, a workpiece may be placed on a conveying device.

When blast treatment is actually performed, a workpiece is set in front of the nozzles 2 of the blast treatment device 1. Alternatively, on the contrary, the blast treatment device 1 is disposed according to the workpiece. Then, the blast media B are supplied from the supply system of the blast media B through supply hoses. Thereby, the blast media B are injected toward the workpiece from the nozzles 2.

On the other hand, the motor 5 drives, thereby the output shaft 5A rotates. The rotation torque of the output shaft 5A is transmitted, as a torque for reciprocating rotation, to the rotating shaft 6A of the rotating member 6 through the power transmission structure 7. Specifically, the rotating plate 9 rotates by rotation of the output shaft 5A of the motor 5. Therefore, one end, which has been rotatably connected with the rotating plate 9, of the connecting bar 10 moves rotationally with drawing a circular locus. Meanwhile, the other end of the connecting bar 10 applies a pressing force and a pulling force alternately and periodically on the end portion of the lever 11, according to a position of the end portion of the connecting bar 10 in the rotating plate 9 side.

As a result, the end portion of the lever 11 in the connecting bar 10 side reciprocates along an arc-like locus around the rotating shaft 6A. Consequently, the other end portion of the lever 11 and the rotating shaft 6A rotates by a predetermined angle with periodically changing the rotational direction. Therefore, the rotating member 6 fixed to the rotating shaft 6A also rotates around the rotating shaft 6A by the predetermined angle with periodically changing the rotational direction. That is, the rotating member 6 reciprocates.

When the rotating member 6 reciprocates, the nozzles 2 reciprocate along an arc-like track together with the bar-shaped member 8 connected to the rotating member 6. Furthermore, the other rotating member 6, which has been connected with the bar-shaped member 8 and has not been directly connected with the power transmission structure 7, also reciprocates along a locus similar to that of the rotating member 6 which has been directly connected with the power transmission structure 7. Thereby, the blast media B are injected against a predetermined range of the workpiece according to a moving range of the nozzles 2.

At this time, the nozzles 2 can be moved relatively to the workpiece in a desired direction by driving a conveying device on which the blast treatment device 1 or the workpiece has been placed. For example, every time when the set of the nozzles 2 reaches the left and right ends, an intermittent step movement of the nozzles 2 can be performed in the vertical direction. Then, blast treatment can be performed over a wide range of the workpiece. Thus, a blasted product can be manufactured by performing the blast treatment of a necessary area.

Note that, the nozzles 2 reciprocate periodically by rotation of the motor 5. However, the weight members 12 have been attached to the other ends of the rotating members 6 so that the rotational moments by the gravity balance. Therefore, a vibration caused by the reciprocation of the nozzles 2 is canceled. As a result, blast treatment of the workpiece can be performed stably.

That is, the blast treatment device 1 as mentioned above is configured to reciprocate an injection part of the blast media B including the nozzles 2 by a crank mechanism. Furthermore, the weight members 12 are attached so as to suppress a vibration caused by reciprocating the nozzles 2.
(Effects)

Therefore, according to the blast treatment device 1, blast treatment can be performed stably with flexibly adapting to a size and a form of a workpiece. Specifically, the blast treatment device 1 has a structure which reciprocates the nozzles 2 by a crank mechanism, instead of the conventional structure in which a nozzle has been attached on the tip of a multijoint arm. Furthermore, the power transmission structure 7 for transmitting an output of the motor 5 can be disposed outside the dust-proof body 4. Therefore, a part which may bring about a clogging due to scattering of the blast media B can be minimized. As a result, the conventional elements, such as a dust-proof cover covering a periphery of a nozzle and a vacuum mechanism, can be unnecessary. Thereby, blast treatment can be performed easily even of a workpiece having irregularity.

Furthermore, a vibration which may be caused by the reciprocation of the nozzles 2 can be suppressed by the weight members 12. Specifically, a problem of a vibration due to adopting a crank mechanism can be effectively suppressed by the weight members 12 although the problem itself of a vibration generation does not arise in the conventional types where a nozzle is moved by a multijoint arm and a dust-proof cover is suctioned onto a workpiece by vacuuming. As a result, a reciprocation of the nozzles 2 using a crank mechanism becomes possible.

Thus, even when a periodical reciprocation of the nozzles 2 is performed, blast treatment can be performed stably. In particular, a vibration caused in a case that the nozzles 2 have been disposed at a high place can be considerably suppressed. Therefore, it becomes possible to dispose the nozzles 2 at a high place. That is, the blast treatment device 1 including the nozzles 2 can be moved throughout a wide range.

Therefore, blast treatment can be performed easily even of a large-sized workpiece, such as an aircraft part, by moving the blast treatment device 1 extensively using a conveying device or the like. That is, according to the blast treatment device 1, blast treatment of a very wide range is possible.
(Second Implementation)

Figure 5:
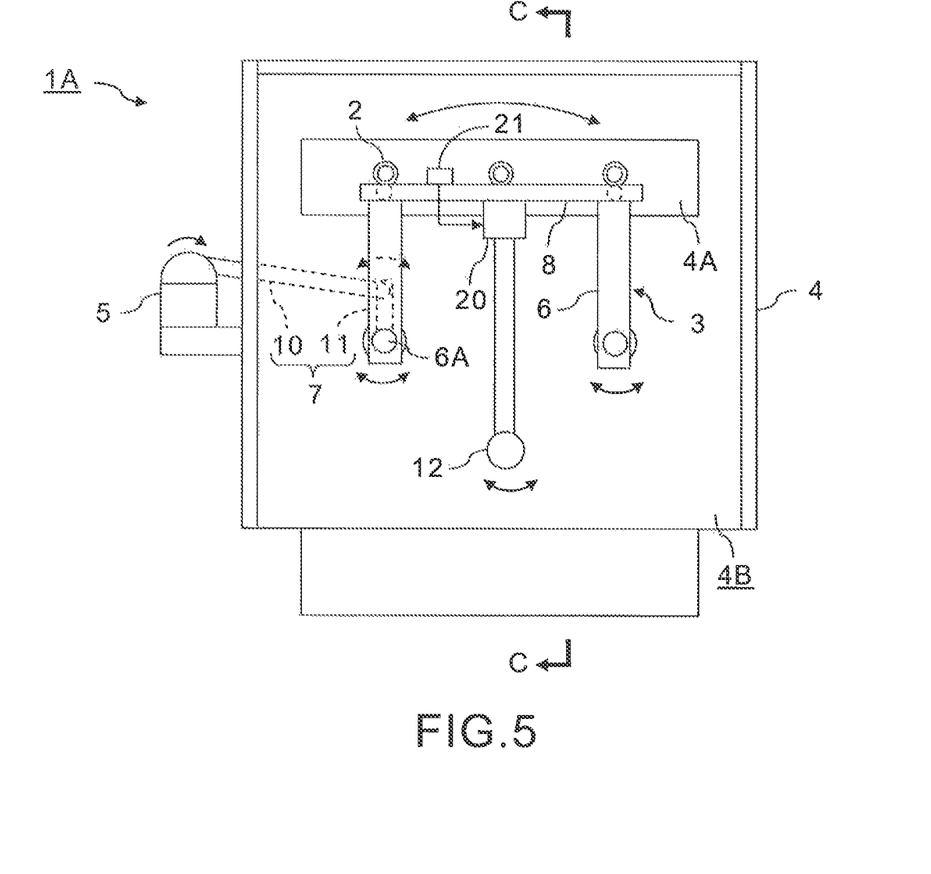
FIG. 5 is a front view of a blast treatment device according to the second implementation of the present invention.
Figure 6:
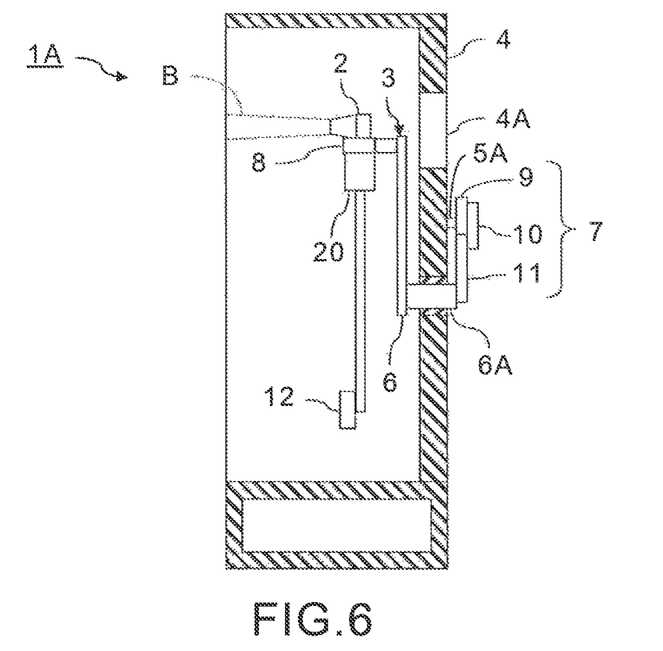
FIG. 6 is a sectional view, as viewed from the position C-C, of the blast treatment device shown in FIG. 5.

FIG. 5 is a front view of a blast treatment device according to the second implementation of the present invention, and FIG. 6 is a sectional view, as viewed from the position C-C, of the blast treatment device shown in FIG. 5.

A blast treatment device 1A in the second implementation shown in FIG. 5 is different from the blast treatment device 1 in the first implementation in the structure that the weight member 12 reciprocates by a weight control device 20. Other structures and functions of the blast treatment device 1A in the second implementation are not substantially different from those of the blast treatment device 1 in the first implementation. Therefore, the same elements are shown by the same signs, and their explanations are omitted.

The blast treatment device 1A has a sensor 21 and the weight control device 20. The sensor 21 can detect a moving direction of the nozzles 2. Therefore, the sensor 21 uses an arbitrary sensor, such as an acceleration sensor, which can detect a moving direction of the sensor 21 itself. The sensor 21 is attached to an arbitrary part, such as the bar-shaped member 8 which moves together with the nozzles 2. Note that, the sensor 21 may be attached to a part such as the rotating member 6 or the rotating shaft 6A as long as the part, to which the sensor 21 is attached, moves periodically together with the nozzles 2.

The weight control device 20 is a device for moving the weight member 12 in a direction to cancel a vibration, according to a moving direction of the nozzles 2 detected by the sensor 21. Therefore, an output destination of the sensor 21 is connected with the weight control device 20. The weight control device 20 can be a pendulum device in which the weight member 12 has been attached to the head. The weight control device 20 has a function to detect the moving direction of the nozzles 2 and a change in the moving direction, based on a detected signal obtained from the sensor 21, and move the weight member 12 in the same direction as the moving direction of the nozzles 2 in a period similar to a period of the reciprocation of the nozzles 2.

An appropriate maximum rotation angle and an appropriate movement period of the weight member 12 can be previously obtained theoretically according to a moving range and a movement period of the nozzles 2, which are known, or empirically by tests. Therefore, the weight member 12 can be controlled by previously determining the appropriate maximum rotation angle and the appropriate movement period of the weight member 12. Alternatively, the weight control device 20 may obtain relative positional information and/or speed information on the sensor 21, such as an acceleration sensor, and autonomously control a rotation angle and a movement period of the weight member 12. In that case, determining the appropriate maximum rotation angle and the appropriate movement period of the weight member 12 can be omitted.

While the blast treatment device 1A having the single weight member 12 and the single weight control device 20 has been exemplified in FIG. 5, a plurality of weight members 12 and a plurality of weight control devices 20 may also be provided to the blast treatment device 1A. Furthermore, the sensor 21 may be built in the weight control device 20.

According to the above-mentioned blast treatment device 1A in the second implementation, a vibration caused by the reciprocation of the nozzles 2 can be canceled by independently controlling the weight member 12. Therefore; according to the blast treatment device 1A in the second implementation, effects similar to those of the blast treatment device 1 in the first implementation can be obtained.
(Third Implementation)

Figure 7:
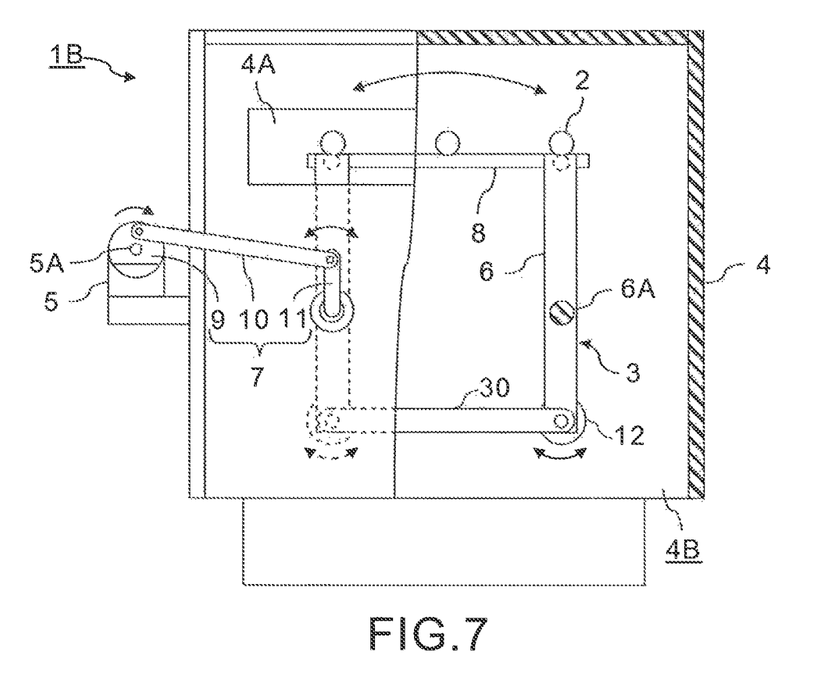
FIG. 7 is a hack view of a blast treatment device according to the third implementation of the present invention.

FIG. 7 is a back view of a blast treatment device according to the third implementation of the present invention.

A blast treatment device 1B in the third implementation shown in FIG. 7 is different from the blast treatment device 1 in the first implementation in the structure that the weight members 12 are connected with each other by a connecting member 30. Other structures and functions of the blast treatment device 1B in the third implementation are not substantially different from those of the blast treatment device 1 in the first implementation. Therefore, the same structures are shown by the same signs, and their explanations are omitted.

As described above, the weight member 12 is attached to the end side of each rotating member 6 opposite to the side, to which the nozzles 2 are attached, with respect to the rotating shaft 6A serving as the fulcrum. Therefore, the movement structure 3 composed of the plural rotating members 6 has the plural weight members 12. Specifically, the plural weight members 12 are attached to the rotating members 6 composing the movement structure 3, in the side opposite to the nozzles 2. In the example shown in FIG. 7, the two weight members 12 have been attached.

When the plural weight members 12 are attached to the movement structure 3, the rotating members 6 supporting the weight members 12 may vibrate. In particular, the vibration may be increased when a period of the reciprocation of the rotating members 6 comes close to a period corresponding to a character frequency of the movement structure 3. Furthermore, when a vibration arises in the rotating members 6, the rotating members 6 may deform.

Accordingly, in the blast treatment device 1B, the weight members 12 are connected with each other, by the connecting member 30, in the end sides of the rotating members 6 opposite to the nozzles 2 with respect to the fulcrums, as shown in FIG. 7. It is appropriate to determine a form, a structure and a material of the connecting member 30 so that a difference between the character frequency of the movement structure 3 including the connecting member 30 and a frequency of the reciprocation of the rotating members 6 can be sufficiently obtained. Furthermore, the connecting member 30 can be connected with each rotating member 6 by a shaft, a bearing or the like so that the connecting member 30 can rotate relative to the rotating members 6, similarly to the bar-shaped member 8 for fixing the nozzles 2.

Therefore, when one end sides of the two bar-shaped rotating members 6 are connected with each other by the bar-shaped member 8 for fixing the nozzles 2 while the weight members 12 attached to the other end sides of the two bar-shaped rotating members 6 are connected with each other by the connecting member 30 as exemplified in FIG. 7, a closed link mechanism is formed by the bar-shaped member 8, the rotating members 6 and the connecting member 30.

Note that, while the weight members 12 have been indirectly connected with each other by connecting the rotating members 6 with each other by the connecting member 30 in the example shown in FIG. 7, the weight members 12 themselves may also be directly connected with each other by the connecting member 30.

According to the above-mentioned blast treatment device 1B in the third implementation, an effect that a vibration due to the reciprocation of the nozzles 2 can be further reduced is achieved, in addition to the effects similar to those of the blast treatment device 1 in the first implementation. Furthermore, when the weight members 12 are directly connected with each other by the connecting member 30, even in a case that a fastener member, such as a bolt or a nut, for fixing the weight members 12 to the rotating members 6 should loosen and drop, damage of a workpiece due to a drop of the weight member 12 itself can be avoided.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A blast treatment device comprising:
   at least one nozzle that injects blast media;
   a movement structure that reciprocates the at least one nozzle along a track;
   at least one weight member that cancels a vibration caused by reciprocating the at least one nozzle;
   a sensor that detects a moving direction of the at least one nozzle; and
   a weight control device that moves the at least one weight member, in a direction to cancel the vibration, according to the moving direction of the at least one nozzle.

2. A blast treatment device comprising:
   at least one nozzle that injects blast media;
   a movement structure that reciprocates the at least one nozzle along a track; and
   at least one weight member that cancels a vibration caused by reciprocating the at least one nozzle, wherein
   the movement structure has at least one rotating member that repeats a normal rotation and a reverse rotation with a rotating shaft as a fulcrum, one end side of the at least one rotating member being coupled to the at least one nozzle, and
   the at least one weight member is disposed on another end side of the at least one rotating member.

3. The blast treatment device according to claim 2, wherein a weight and a location of the at least one weight member are determined to make a rotational moment around the fulcrum by a gravity on a side of the at least one nozzle become not more than a rotational moment around the fulcrum by a gravity on a side of the at least one weight member.

4. The blast treatment device according to claim 2, wherein a weight and a location of the at least one weight member are determined to make a rotational moment around the fulcrum by a gravity become zero.

5. The blast treatment device according to claim 2, wherein the movement structure further has:
   a motor having an output shaft, the output shaft and the rotating shaft lie on different straight lines; and
   a power transmission structure that couples the output shaft to the rotating shaft, the power transmission structure being configured to transmit a rotative power in one direction from the output shaft to the rotating shaft as a power for repeating the normal rotation and the reverse rotation of the at least one rotating member.

6. The blast treatment device according to claim 5, further comprising:
   a dust-proof body that prevents scattering of the blast media by covering at least the at least one nozzle,
   wherein at least the motor and the power transmission structure are disposed outside the dust-proof body.

7. The blast treatment device according to claim 5, wherein the power transmission structure has:
   a rotating plate fixed to the output shaft of the motor; and
   a connecting bar rotatably coupled to each of the at least one rotating member and a portion other than a rotation center of the rotating plate, wherein a weight of the rotating plate on a side opposite to a coupling position of the connecting bar with respect to the rotation center is adjusted to suppress a vibration caused by a rotation of the rotating plate.

8. A blast treatment device comprising:
at least one nozzle that injects blast media;
a movement structure that reciprocates the at least one nozzle along a track; and
at least one weight member that cancels a vibration caused by reciprocating the at least one nozzle, wherein
the at least one nozzle comprises multiple nozzles,
the at least one weight member comprises multiple weight members and
the movement structure has:
   at least one bar-shaped member that fixes the nozzles; and
   rotating members that each repeat a normal rotation and a reverse rotation with a corresponding rotating shaft as a fulcrum, one end side of each of the rotating members being coupled to the at least one bar-shaped member, and
the multiple weight members are attached to other end sides of the rotating members respectively.

9. The blast treatment device according to claim 8, further comprising:
a connecting member that couples the weight members with each other directly or indirectly in the other end sides of the rotating members.

10. The blast treatment device according to claim 9,
wherein the at least one bar-shaped member, the rotating members and the connecting member form a link mechanism.

11. A blast treatment method comprising:
utilizing the blast treatment device according to claim 1 to:
   inject blast media from at least one nozzle;
   reciprocate the at least one nozzle along a track; and
   cancel a vibration, caused by reciprocating the at least one nozzle, by at least one weight member.

12. A blast treatment method comprising:
utilizing the blast treatment device according to claim 2 to:
   inject blast media from at least one nozzle;
   reciprocate the at least one nozzle along a track; and
   cancel a vibration, caused by reciprocating the at least one nozzle, by at least one weight member.

13. A blast treatment method comprising:
utilizing the blast treatment device according to claim 8 to:
   inject blast media from at least one nozzle;
   reciprocate the at least one nozzle along a track; and
   cancel a vibration, caused by reciprocating the at least one nozzle, by at least one weight member.

* * * * *